Aug. 23, 1960  B. G. SOUTHWARD  2,950,393
GAMMA COMPENSATED NEUTRON DETECTOR
Filed Nov. 20, 1956
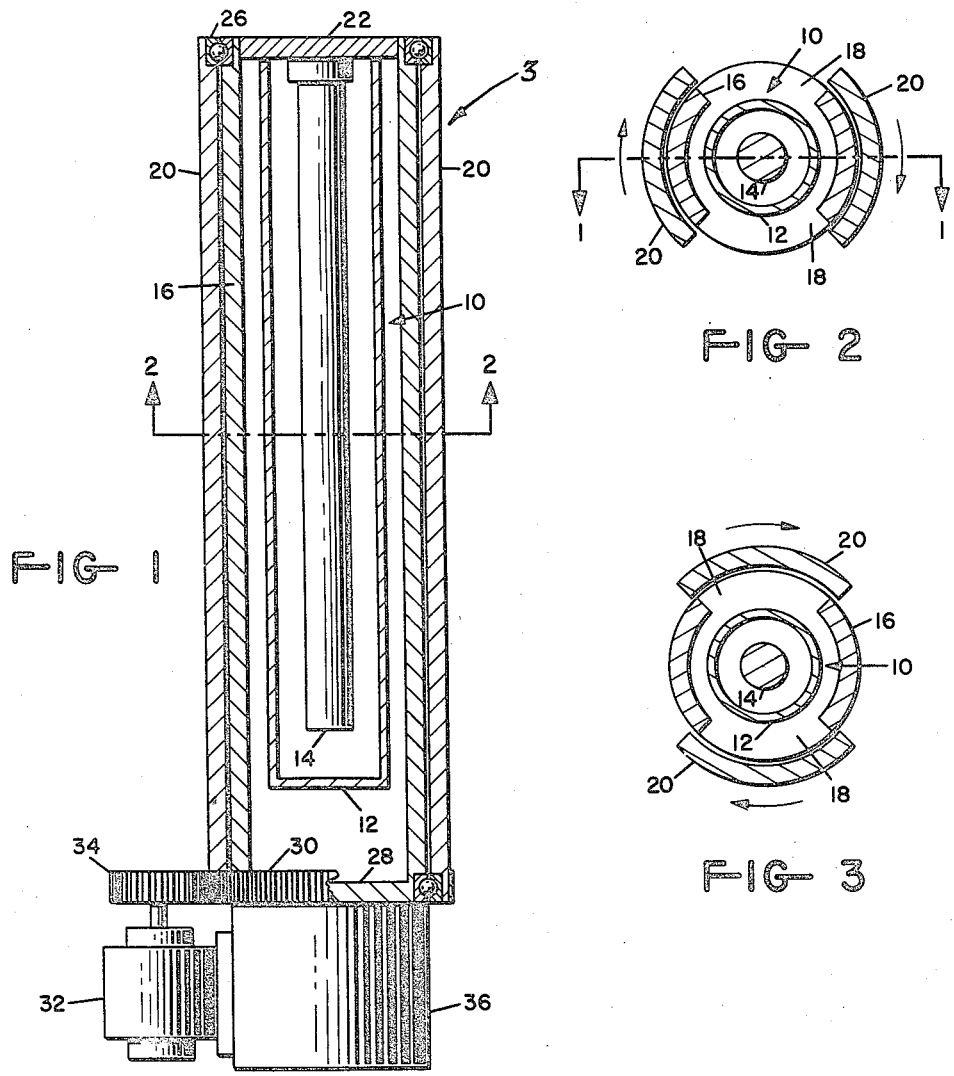
INVENTOR.
BEN G. SOUTHWARD
BY Allen M Krass
AGENT

United States Patent Office 2,950,393
Patented Aug. 23, 1960

2,950,393

GAMMA COMPENSATED NEUTRON DETECTOR

Ben G. Southward, Southfield Township, Oakland County, Mich., assignor to The Bendix Corporation, a corporation of Delaware Filed Nov. 20, 1956, Ser. No. 623,411

2 Claims. (Cl. 250—83.1)

This invention relates to a device for detecting the intensity of neutron radiation and more particularly to such a detector which provides an indication that is not affected by any coincident gamma ray radiation.

Neutron radiation is often detected in an indirect method which involves the use of an ionization chamber the walls of which have a coating that emits particles upon the impact of neutrons. A typical material of this type is boron, which emits lithium ions and alpha particles under neutron bombardment. These particles in turn cause the gas in the chamber to ionize and become attracted to a charged collector. The current at this collector thus provides an indication which is proportional to the intensity of the incident neutron radiation. In such an arrangement the ionization chamber acts as an amplifier for the particles given out by the neutron sensitive material. This amplification is necessary because of the relative weakness of both the neutron radiation and the secondary particles emitted by the neutron sensitive material.

Such devices share the common difficulty of their ionization chambers being sensitive to other types of incident radiation which commonly occur along with neutron radiation. Since ionizing gamma radiation often occurs along with neutron radiation, there is a particular problem presented in providing an indication of neutron radiation which is free of the influence of gamma radiation.

As it is possible to provide a device which will indicate the incident gamma ray radiation without being influenced by neutron radiation, several types of systems have been developed which employ a gamma ray detector in a bridge circuit with a neutron detector to balance out the undesirable gamma effect on the neutron detector. In one such device two separate chambers are used and their electrical outputs are manually adjusted so as to provide the correct balance. In another device two concentric chambers are employed and their physical positions relative to one another are adjusted so as to provide the correct balance relationship.

These devices have several disadvantages. First, in each the two chambers receive incident radiation at points which are spacially separated. In order for the devices to work perfectly the gamma ray compensating chamber must provide an exact indication of the intensity of the gamma ray radiation on the neutron detecting chamber. Unless the chambers occupy identical volumes this is impossible. In practical applications this may be very important since gamma ray radiation often varies considerably in points separated from each other by small distances.

Another disadvantage that these devices share is the need for balancing. In the concentric chamber device it is necessary to mechanically adjust the two chambers relative to one another to achieve a null condition. This operation requires a control system employing a servo mechanism which is inherently complicated and, therefore, subject to maintenance difficulties. The device which employs two separate chambers likewise requires an adjustment process which may be performed manually at a point external of the chamber. This balancing process is only completely valid at the time when it is performed so that later readings may have to take into account the drift of the instruments.

The present invention contemplates a novel neutron intensity detecting device is free from the disadvantages associated with the aforementioned prior art devices. In essence, this novel device comprises an ionization chamber which has one portion of its external surface covered with a shield which prevents the passage of neutron radiation by absorbing the neutrons. A shutter which is also an absorber of neutron radiation is intermittently placed across the remaining open portion of the surface, thereby essentially preventing any neutron radiation from reaching the inner chamber. The collector of the chamber therefore receives the current which varies between one value which is representative of the incident gamma radiation and another value which is representative of a combination of neutron radiation and gamma radiation. The difference signal represents an alternating current which is proportional to neutron radiation alone.

Since the device employs only a single chamber, it is not subject to the disadvantage of having different gamma radiations on the spacially separated chambers of a double chamber instrument. Furthermore, since the device does not balance out the differences but rather provides an indication which is automatically equal to the difference no adjustment process must be periodically performed.

It is, therefore, an object of the present invention to provide a detector of neutron radiation intensity.

It is another object of the present invention to provide a neutron radiation intensity detector which is calibrated to compensate for simultaneous gamma ray radiation.

Another object of the present invention is to provide a neutron intensity detector which employs a neutron sensitive material and an amplifying ionization chamber.

Another object of the present device is to provide a gamma compensated neutron radiation intensity detector which employs but a single ionization chamber.

It is another object of the present invention to provide a gamma compensated neutron intensity detector which does not require periodic balancing.

It is another object of the present invention to provide a neutron radiation intensity detector which employs a single chamber and intermittently prevents the entrance of neutrons to such chamber.

It is a further object of the present invention to provide gamma compensated neutron radiation intensity device which provides an output signal which represents the intensity of incident neutron radiation.

Other objects, advantages and applications of the present invention will be made apparent by the following detailed description of an embodiment of the invention.

The description makes reference to the accompanying drawing in which:

Figure 1 is a cross sectional elevation view, partially broken away taken along line 1—1 of Figure 2, showing the neutron detection chamber which employs the principle of the present invention;

Figure 2 is a plan cross-section of the detector taken along line 2—2 of Figure 1 and showing the shutter in an open position;

Figure 3 is a plan cross-section of the detector taken along line 2—2 of Figure 1 and showing the shutter in a closed position; and Figure 4 is a schematic diagram of an electrical circuit which may be employed in conjunction with the detector.

The sensing element of the neutron detector is a neutron sensitive ionization chamber of the standard type generally indicated at 10. It consists of an aluminum cylinder 12 with closed ends which are coated with boron on its interior surface. An aluminum rod 14 extends longitudinally along the central axis of the cylinder 12. The chamber 10 is filled with argon or a gas with similar ionization properties.

Such a chamber is sensitive to both neutron radiation and gamma rays. When these particles strike the interior boron coating some of them cause alpha particles and positive lithium ions to be emitted. These particles cause the argon gas contained within the cylinder 12 to ionize. The negative ions are attracted to the positively charged central rod 14 and they cause a current to flow to the rod. The magnitude of this current is proportional to the intensity of the incident neutron and gamma ray radiation.

The radiation chamber 10 is supported on the central longitudinal axis of a large cylinder 16 by an end cap 22. The cylinder 16 is enclosed at each end and has two longitudinal slots 18 cut out of diametrically opposite sides of its curved surface. The cylinder 16 is constructed from a material such as cadmium or boron which offers a high cross section to neutrons and, therefore, effectively absorbs them. Neutrons, therefore, only enter the interior of the cylinder 16 through the slots 18.

A shutter generally indicated at 3 consisting of two longitudinal cylindrical segments 20 arranged on diametrically opposite sides of the cylinder 16 is rotatably supported at its top end by a bearing 26 which has its inner race fixed to the top of the cylinder 16. At its lower end the shutter 20 is supported by a bearing 28 which has its inner race connected to the lower edge of the cylinder 16.

A ring gear 30 is mounted around the lower end of the shutters 20 and is fixedly attached to them so as to cause them to rotate about the cylinder 16 when the gear revolves. This action is accomplished through a motor 32 which has a spur gear 34 fixed on its output shaft. The gears 30 and 34 mesh so as to rotate the shutters 20 when the motor 32 is energized. The motor 32 is mounted in a stationary position with respect to the cylinder 16 by means of a block 36. As the shutter rotates the segments 20 periodically close off both of the slots 18 simultaneously as is shown in Figure 3. The shutter 20 is also composed of a material such as boron or cadmium which is an efficient absorber of neutron radiation but which passes gamma radiation. Therefore, at such times as the shutters 20 cover the slots 18 no neutron radiation reaches the ionization chamber 10, and the chamber 10 provides an output which is proportional to the gamma radiation being received. At such times as the shutters 20 are so disposed as to open the slots 18, as in Figure 2, the ionization chamber 10 receives both gamma and neutron radiation and its indication is proportional to the sum of these radiations.

Figure 4 represents a circuit which may be employed with the neutron detector of Figure 1. The casing 12 of the ionization chamber 10 is provided with a negative potential by a battery 38 which has its positive terminal grounded. The ionization chamber rod 14 is, therefore, maintained at a negative potential with respect to the casing 12 so as to attract the negative ions produced in the gas. The rod 14 is coupled to an amplifier 40 through a capacitor 42 and a grounded resistor 44. The amplifier 40 provides its output to an indicating device 46 such as a recording device or a voltmeter.

Since the gamma radiation to the chamber 10 is constant it appears in the output of the rod 14 as D.C. component which is passed to ground through the resistor 44. The neutron radiation being of an intermittent nature provides an alternating current potential which is passed by the capacitor 42 and amplified.

By varying the speed of the motor it is possible to vary the frequency of the alternating potential which is proportional to neutron radiation.

The present invention may be seen to essentially comprise an ionization chamber which is sensitive to both neutron and gamma ray radiation and means for controlling the radiation to the chamber so that the neutron radiation is periodically prevented from reaching the chamber. Such an arrangement eliminates the necessity of using two separate chambers and either electrically or mechanically balancing their outputs so as to eliminate the effect of the gamma radiation. The present device also allows for a more accurate reading since it does not measure gamma and neutron radiation at separated points.

The physical construction of the present device, therefore, need only be limited to provide means for interrupting the incident neutron radiation.

Having thus described an embodiment of my invention, I claim:

1. A neutron radiation intensity gauge comprising: a neutron sensitive ionization chamber; a cylindrical neutron absorbing cover surrounding said ionization chamber; a longitudinal slot on the curved surface of said cover; a longitudinal neutron absorbing shutter mounted on said cover and having dimensions generally greater than that of said slot; and means for continually rotating said shutter around said cover, whereby said slot is periodically blocked to neutron radiation.

2. A neutron radiation intensity gauge comprising: an enclosed chamber having an interior coating which radiates a secondary emissive particle upon bombardment from either neutron or gamma rays; a gas contained within said chamber of a type which ionizes upon its bombardment by said secondary particles; an electrode disposed within said chamber and maintained at a potential sufficient to attract a portion of the gas ions; a neutron absorbing cover substantially surrounding said chamber; apertures in said cover; a shutter member disposed about said cover, said shutter being of such configuration as to close said apertures when in a certain position; and means for periodically placing said shutter in such a position as to close said apertures.

References Cited in the file of this patent

UNITED STATES PATENTS

| | | |
|---|---|---|
| 2,499,311 | Herzog et al. | Feb. 28, 1950 |
| 2,518,115 | Bernstein | Aug. 8, 1950 |
| 2,795,704 | Bryant et al. | June 11, 1957 |

FOREIGN PATENTS

| | | |
|---|---|---|
| 615,562 | Great Britain | Jan. 7, 1949 |